United States Patent [19]

Crissy et al.

[11] 4,384,638
[45] May 24, 1983

[54] AUTOMATIC BRAKE SLACK ADJUSTER

[75] Inventors: Charles F. Crissy, Jackson; Fred C. Kresky, Augusta, both of Mich.

[73] Assignee: Aeroquip Corporation, Jackson, Mich.

[21] Appl. No.: 224,303

[22] Filed: Jan. 12, 1981

[51] Int. Cl.³ ............................................. F16D 65/52
[52] U.S. Cl. ........................... 188/79.5 K; 188/196 M; 188/196 BA; 188/196 D
[58] Field of Search .................. 188/79.5 GE, 79.5 K, 188/79.5 SC, 79.5 SS, 196 D, 196 F, 196 P, 196 V, 196 BA, 196 M; 192/111 A

[56] References Cited

U.S. PATENT DOCUMENTS

| Re. 26,965 | 2/1965 | Sander et al. | 188/79.5 K |
|---|---|---|---|
| 3,261,433 | 5/1964 | Page | 188/79.5 K |
| 3,361,230 | 1/1968 | Hildebrand et al. | 188/79.5 K |
| 3,428,154 | 10/1967 | Lodjic et al. | 188/79.5 K |
| 3,526,303 | 9/1970 | Lodjic et al. | 188/79.5 K |
| 3,921,765 | 11/1975 | Swander, Jr. | 188/79.5 K |
| 3,997,036 | 12/1976 | Zeidler | 188/79.5 K |

FOREIGN PATENT DOCUMENTS 576613 4/1946 United Kingdom ........... 188/196 M

Primary Examiner—Douglas C. Butler
Assistant Examiner—R. R. Diefendorf
Attorney, Agent, or Firm—Beaman & Beaman

[57] ABSTRACT

The invention pertains to an automatic brake slack adjuster wherein incremental vehicle brake adjustments are automatically produced as brake lining wear occurs. The novel features include the simplification of structure, the provision of preadjustment including a drive gear which is automatically disengaged from a worm gear upon the placing of a wrench upon an adjustment shaft to simplify preadjustment, and a universal bracket is utilized permitting the adjuster to be readily employed with a wide variety of vehicle brake rod structures eliminating the need for special fittings and modifications.

2 Claims, 6 Drawing Figures

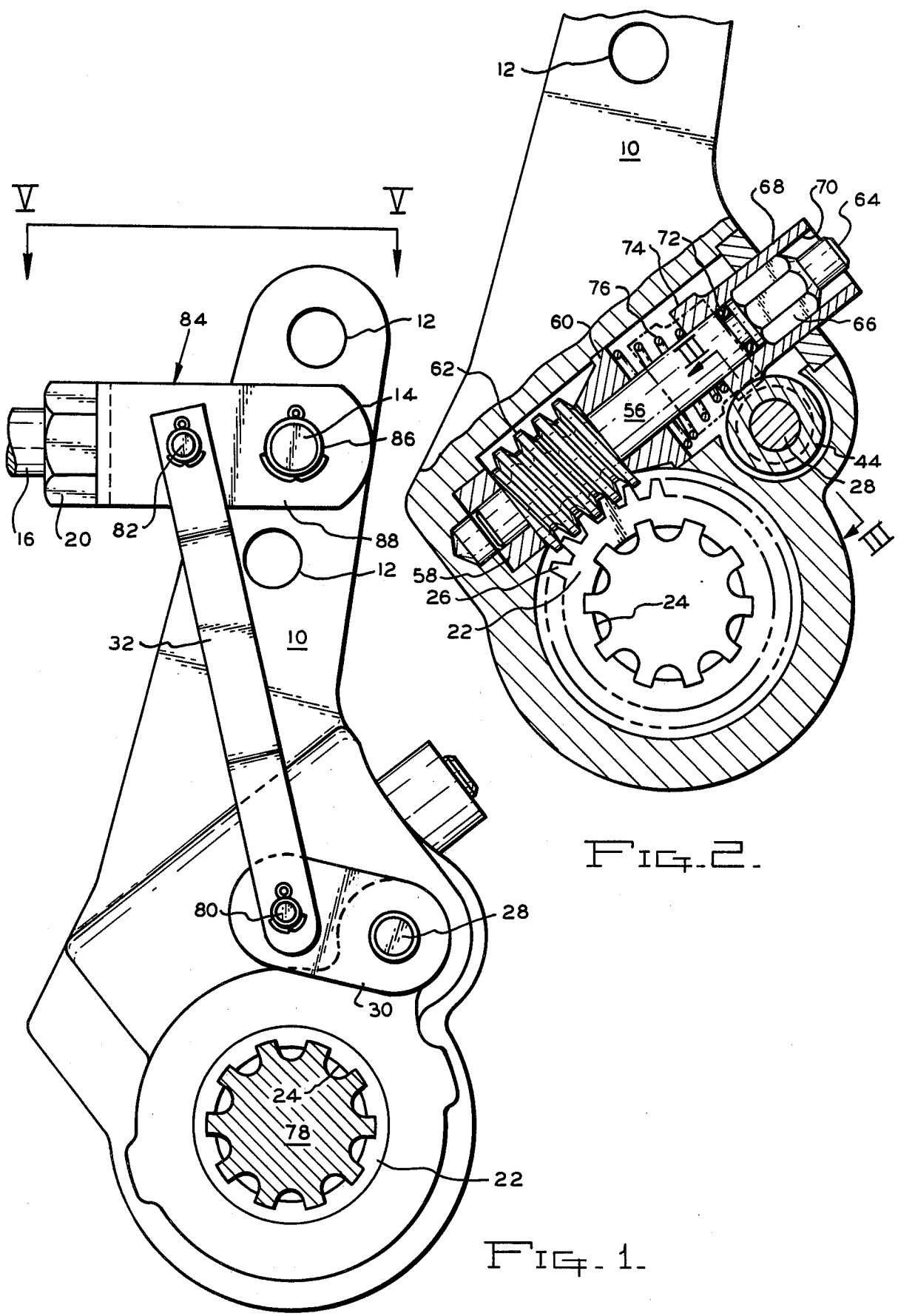

AUTOMATIC BRAKE SLACK ADJUSTER

BACKGROUND OF THE INVENTION

Vehicle brakes require periodic adjustment as the lining wears, and a number of automatic adjusters have been designed wherein the brake operating structure automatically compensates for such wear. Some adjusters operate when the vehicle is braked while in reverse, and in heavy duty vehicles, such as trucks and semi trailers, the brake slack adjusters are often incorporated into actuating members interposed between a brake rod and the brake operating shaft. The invention is particularly directed to brake slack adjusters of the type used with heavy duty vehicles, and constitutes an improvement over the brake slack adjuster disclosed in the assignee's U.S. Pat. No. 3,921,765.

Heavy duty automatic brake slack adjusters are known to utilize unidirectionally driven worms for rotating a worm gear, which, through appropriate mechanism, incrementally adjusts that portion of the brake actuator directly connected to the brake operating shaft. The worm drive unit may be connected to the vehicle brake actuating rod in such a manner that a motion is supplied to the actuator mechanism each time the brakes are actuated, but due to lost motion apparatus adjustment of the slack take-up occurs only when sufficient brake wear has occurred to permit sufficient movement of the adjusting apparatus. Typical brake slack adjusters of the aforementioned type are shown in U.S. Pat. Nos. Re. 26,965; 3,261,433 and 3,428,154.

In the assignee's U.S. Pat. No. 3,921,765 an automatic brake slack adjuster is disclosed of the aforementioned type, and the invention improves upon such apparatus by simplifying the structure, providing improved unidirectional drive and holding characteristics, simplifying the manual preadjustment procedure, and minimizing the necessity for special hardware directly associated with the brake actuating rod and yoke connected to the brake adjuster.

It is an object of the invention to provide an automatic vehicle brake slack adjuster of relatively simplified construction capable of automatically adjusting vehicle brakes in accordance with brake wear.

A further object of the invention is to provide an adjuster for vehicle brakes which may be readily operated and preadjusted without requiring special skill, and wherein an extended operating life is achievable due to "lifetime" lubrication sealing.

Another object of the invention is to provide an automatic brake slack adjuster employing a universal bracket with its operating linkage which eliminates the necessity for special hardware or modification of the vehicle brake operating rod or fittings.

In the practice of the invention the adjuster includes a body interposed between the vehicle brake operating rod and the brake operating shaft. The adjuster incorporates a worm drive unit connected to the brake rod by a bracket at a location spaced from the primary pivotal connection between the adjuster and brake rod whereby movement of a linkage occurs during each braking cycle. The worm drive incorporates unidirectional clutch means rotating a second worm drive unit through a displaceable worm gear which, when disengaged from its associated worm, permits preadjustment or major adjustment, by means of a conventional socket wrench connection. The placing of a socket wrench upon the second worm shaft automatically disengages a worm gear from the worm of the first drive unit, and removal of the wrench socket automatically permits worm and worm gear reengagement.

The linkage associated with the first worm drive unit utilizes a bracket pivotally connected to the primary adjuster-brake rod pivot pin, and this bracket includes a pivot spaced from the primary pivot pin opening and a slot for receiving the brake rod. Thus, the slot assures proper orientation of the bracket to the brake rod, and motion is transmitted to the adjuster linkage during each braking cycle without modification to the brake rod, brake rod yoke, or other standard vehicle components.

DESCRIPTION OF THE DRAWINGS

The aforementioned objects and advantages of the invention will be appreciated from the following description and accompanying drawings wherein:

FIG. 1 is an elevational view of an automatic brake slack adjuster in accord with the invention, FIG. 2 is an elevational, enlarged, detail partially sectioned view of the adjuster.

DESCRIPTION OF THE PREFERRED EMBODIMENT

Figure 3:
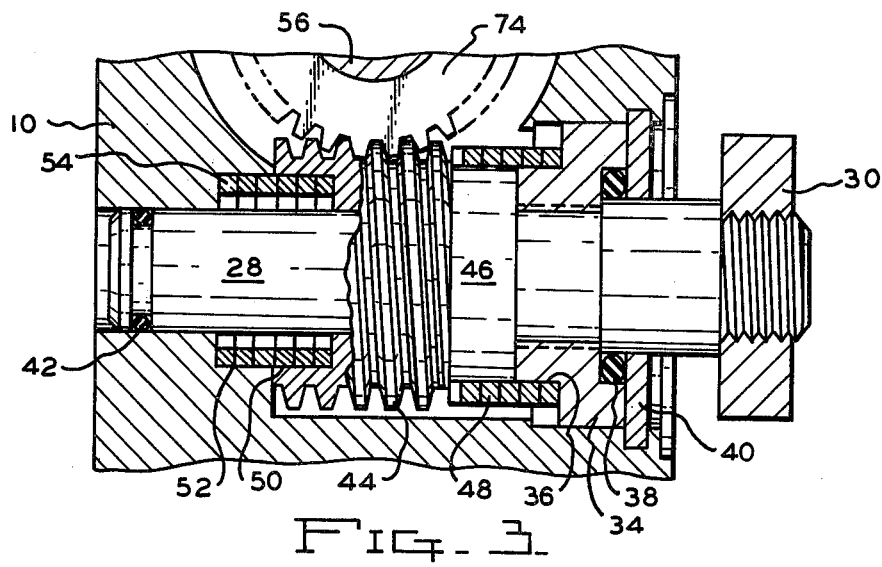
FIG. 3 is an enlarged, sectional view as taken through Section III—III of FIG. 2 illustrating a right hand installation.

With reference to FIGS. 1 and 2, the adjuster comprises an elongated body 10 of metal having an upper arm portion in which three pivot holes 12 are defined, one of which receives the pivot pin 14 for connecting the brake rod 16 to the adjuster by means of yoke 18 threaded upon the end of rod 16, and a lock nut 20 is also threaded upon the rod.

The adjuster also includes a gear 22 rotatably mounted within the adjuster body 10 having an accessible splined bore 24, and exterior gear teeth 26 for engaging a worm, as later described.

The adjuster includes a first worm drive assembly mounted upon a shaft 28, FIG. 3, having an axis parallel to the axis of pivot pin 14 and gear 22. The shaft 28 includes an outer end to which an indexing lever 30 is affixed, and a linkage 32, FIG. 1, is pivotally connected to the lever for producing oscillation of the shaft 28 during each braking cycle.

A driving hub 34 is fixed to shaft 28 by a splined press fit, and the hub includes a cylindrical surface 36 and is sealed with respect to the shaft by O ring 38. Washer 40 mounted within a groove engages the outer edge of the hub 34 and forms a portion of the shaft seal. The other end of the shaft 28 is sealed with respect to the adjuster body by an O ring 42 located within a groove defined in the shaft.

A worm 44 is rotatably mounted upon the central region of shaft 28 and includes a cylindrical surface 46 having a diameter equal to, and adjacent, the hub surface 36 whereby a spirally wound clutch spring 48 firmly engages the surfaces 36 and 46 constituting a unidirectional driving clutch between the hub and worm.

The worm 44 is concentrically and cylindrically recessed at 50, and this recess aligns with the cylindrical recess 52 defined in the adjuster body 10 whereby the spirally wound clutch spring 54, which is of an opposite hand as compared with spring 48, engages the recesses 50 and 52 at its exterior surface and resists rotation of the worm 44 in a direction opposite to that driven by shaft 28 and hub 34.

A second shaft 56 is rotatably supported within adjuster 10 upon bearings 58 and 60. The axis of the shaft 56 is perpendicularly disposed to the axis of shaft 28, and the worm 62 is fixed upon the shaft and meshes with the teeth 26 of gear 22.

The outer end of shaft 56 includes a pilot portion 64 and a hexagonal portion 66, and a sleeve 68 having a hexagonal bore 70 is axially slidably mounted upon the shaft and sealed thereto by O ring 72.

The sleeve 68 includes a toothed worm gear portion 74 adapted to selectively mesh with worm 44, FIG. 3, and a compression spring 76 interposed between bearing 60 and sleeve 68 biases the sleeve outwardly assuring normal engagement of the gear portion 74 and worm 44 and the hexagonal portion 66 within the sleeve hexagonal bore 70 establishes a keyed relationship between shaft 56 and the sleeve.

The bore 24 of gear 22 is internally splined for receiving the brake operating shaft 78, and it will be appreciated that rotation of the body 10 about the axis of gear 22 will rotate the brake operating shaft 78 to actuate the vehicle brakes.

Figure 5:
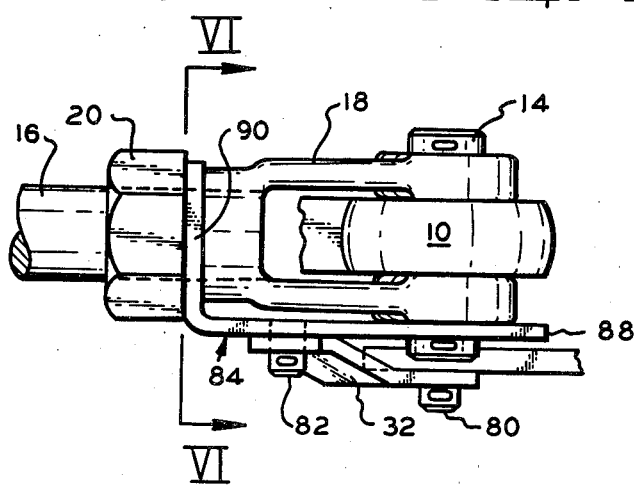
FIG. 5 is a top plan view as taken along Section V—V of FIG. 1.
Figure 6:
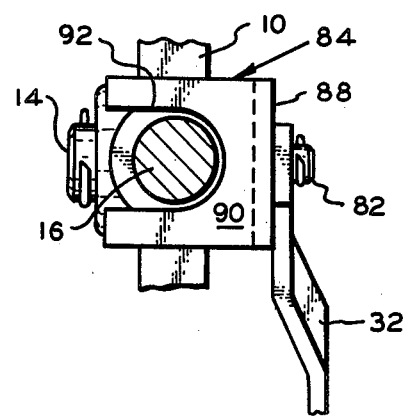
FIG. 6 is an elevational, sectional view through the brake rod as taken along Section VI—VI of FIG. 5.

The indexing lever 30 is connected to linkage 32 by pivot pin 80, and the other end of the linkage is pivotally connected by stud pin 82 to bracket 84, FIGS. 1, 5 and 6. The bracket 84 comprises sheet metal member of L configuration having a hole 86 defined in portion 88 for receiving the pivot pin 14. The stud pivot pin 82 is attached to the portion 88 spaced from the pin 14 whereby this spacing will determine the extent of oscillation of the index lever 30 during each brake cycle.

The bracket portion 90 is provided with a slot 92 which receives the brake rod 16, and the lock nut 20 may be threaded against the portion 90. Accordingly, it will be appreciated that the bracket 84 is readily mounted upon pivot pin 14, and rod 16, and provides the necessary connection of the linkage 32 to the brake rod structure without requiring any modification to the brake rod or its yoke 18, as is the usual case.

The length of the slot 92 is parallel to the axis of the pivot pin 14, and this relationship prevents the bracket 84 from pivoting with respect to the pin even though the lock nut 20 should loosen.

In operation, the apparatus is assembled as shown in FIG. 1, with the bracket 84 placed upon pivot pin 14, and the brake rod 16 pivotally connected to the desired adjuster hole 12. The brake operating shaft 78 is splined to the gear 22, and rotation of the adjuster by the rod 16 will rotate the brake shaft 78 to apply the vehicle brakes.

The preliminary adjustment of the adjuster to the brakes during initial installation, or when new brake linings have been installed, or for other reasons, may be readily accomplished manually by the operator placing a socket wrench against the outer end of the sleeve 68 and pushing the socket wrench against the sleeve end to compress the spring 76 and bias the sleeve to the dotted line position of FIG. 2. Under such circumstances the worm gear teeth 74 are out of engagement with the worm 44, and the wrench socket will be engaging the hexagonal portion 66. Thus, the operator may rotate the shaft 56, as desired, to rotate gear 22 and rapidly position the body 10 as desired. Upon withdrawing the wrench socket from hexagonal portion 66 the spring 76 will bias the sleeve outwardly meshing gear portion 74 with worm 44.

During each braking cycle the rotation of the adjuster body 10 by rod 16 produces an oscillation of the indexing lever 30 due to the spacing between pivot pin 14 and pin stud 82. This oscillation of the lever 30 is transferred to the shaft 28, hub 34 and to the worm 44 through unidirectional clutch spring 48. Due to the inherent design of the clutch spring 54 a lost motion occurs between the rotation of the worm 44 and the ability of the spring 54 to "grip" the adjuster recesses 50 and 52, and accordingly, during most instances of the braking cycling the rotation of the worm 44 is not sufficient to significantly rotate shaft 56. However, when sufficient brake wear has occurred the clutch spring 54 will hold the worm 44 against "reverse rotation" and an indexing of the worm 44 occurs, producing rotation of the sleeve 68, worm 62 and gear 22. This indexing preferably occurs during the return stroke of the brake adjuster and brake rod 16.

Figure 4:
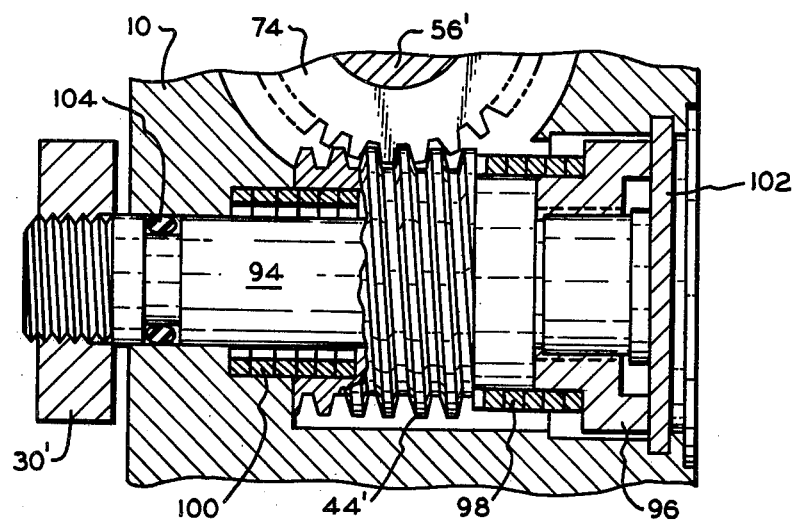
FIG. 4 is an enlarged, detail, sectional, elevational view similar to FIG. 3 illustrating a left hand installation.

The adjuster 10 is normally used in pairs, right and left adjusters being used with right and left vehicle brakes, respectively, and to accomodate such pairing it is desirable to adapt the adjuster for right or left hand operation. FIG. 4 illustrates a shaft 94 which is substituted for the shaft 28 of FIG. 3 to permit the adjuster to be used in a left hand installation.

The shaft 94 includes an outer end to which the indexing lever 30' is affixed, and the indexing lever is associated with a linkage and bracket in a manner identical to that previously described. A hub 96 is keyed to the shaft and includes a cylindrical surface upon which the unidirectional driving spring 98 is received, and the reverse rotation of the worm 44', which is rotatably mounted upon the shaft 94, is prevented by the spiral spring 100 received within cylindrical recesses in the worm and adjuster as previously described. A sealing disc 102 seals the shaft recess, and the O ring 104 seals the shaft to the adjuster body adjacent the shaft outer end. The operation of the structure of FIG. 4 is identical to the adjuster operation described above.

The disclosed brake slack adjuster automatically compensates for brake wear, and minimizes the number of components required to accurately adjust the apparatus. Manual operation is simplified by the use of the sleeve 68 and hexagonal portion 66, and the bracket 84 further reduces costs by eliminating any necessity for special fittings associated with the brake rod 16. The operating components of the adjuster of the invention can be initially lubricated, and as these components are sealed, such lubrication will suffice for the life of the adjuster. By having clutch spring 48 internally grip its associated cylindrical hub and worm surfaces, and by using the exterior surface of spring 54 to engage recesses 50 and 52, a larger spring 48 can be used which is capable of transmitting higher torque with less play or lost motion, and yet spring 54 provides the necessary clearance.

It is appreciated that various modifications to the invention may be apparent to those skilled in the art without departing from the spirit and scope of the invention.

We claim:

1. In an automatic brake adjuster interposed between a brake operating shaft and a brake operating rod, the brake adjuster including a body having slack adjustment means defined therein including an adjustment shaft having a worm fixed thereon meshing with a brake operating shaft actuator and a gear concentrically rotatably fixed to the adjustment shaft for rotating the same; the gear being selectively driven by an operating worm operatively connected to the brake operating rod, the improvement comprising key means defined on the adjustment shaft keying the gear thereto, said key means permitting axial slidable displacement of the gear upon the adjustment shaft between engaged and disengaged positions relative to the operating worm, spring means biasing the gear toward said operating worm engaged position and gear retaining means defined on the adjustment shaft aligning the gear with the operating worm at said engaged position, the gear being axially displaceable on the adjustment shaft against the spring biasing force to shift the gear to said disengaged position, said key means comprising a non-circular wrench engaging portion defined on the adjustment shaft, the gear having an accessible socket of a configuration complementary to said wrench engaging portion whereby displacement of the gear to said disengaged position exposes said wrench engaging portion for engagement by a wrench to rotate the adjustment shaft.

2. In an automatic brake adjuster as in claim 1 wherein said wrench engaging portion comprises a hexagonal configuration.

* * * * *